United States Patent
Khosla et al.

(10) Patent No.: US 11,176,509 B1
(45) Date of Patent: Nov. 16, 2021

(54) FLEXIBLE PRODUCT DELIVERY MODEL

(71) Applicant: Dell Products L.P., Round Rock, TX (US)

(72) Inventors: Robin Khosla, Bangalore (IN); Pragya Agarwal, Jalpaiguri (IN); Madhusmita Panda, Bhadrak (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/931,113

(22) Filed: May 13, 2020

(51) Int. Cl.
*G06Q 10/08* (2012.01)
*G06Q 30/06* (2012.01)
*G06F 3/12* (2006.01)

(52) U.S. Cl.
CPC ... *G06Q 10/0832* (2013.01); *G06Q 10/08355* (2013.01); *G06Q 30/0633* (2013.01); *G06Q 30/0641* (2013.01); *G06F 3/12* (2013.01)

(58) Field of Classification Search
None
See application file for complete search history.

(56) References Cited

U.S. PATENT DOCUMENTS

| | | | | |
|---|---|---|---|---|
| 7,617,112 B2 * | 11/2009 | Harrison, Jr. | ........ | B42D 15/006 705/1.1 |
| 7,647,231 B2 * | 1/2010 | Kuebert | ............... | G06Q 10/083 705/1.1 |
| 7,657,439 B2 * | 2/2010 | Kadaba | ............ | G07B 17/00661 705/1.1 |
| 10,373,098 B2 * | 8/2019 | Kuebert | ............. | G06Q 10/0832 |
| 10,824,982 B1 * | 11/2020 | Whitehouse | ....... | G06Q 10/0832 |
| 2002/0165729 A1 * | 11/2002 | Kuebert | ............... | G06Q 10/083 705/338 |
| 2007/0046019 A1 * | 3/2007 | Harrison, Jr. | ........ | B42D 15/006 283/61 |
| 2007/0250326 A1 * | 10/2007 | Kadaba | .................... | B07C 3/14 705/408 |
| 2014/0324726 A1 * | 10/2014 | Kuebert | ............. | G06Q 30/0637 705/333 |

(Continued)

OTHER PUBLICATIONS

Anon., "FedEx Refreshes Web Tracking Tools," Business Wire [New York] Jan. 29, 2009. (Year: 2009).*

(Continued)

*Primary Examiner* — Nicholas D Rosen
(74) *Attorney, Agent, or Firm* — Daly, Crowley, Mofford & Durkee, LLP

(57) ABSTRACT

A method is provided comprising: presenting one or more first user interface components for specifying a first address; receiving user input specifying at least a portion of the first address, the user input being received by using the one or more first user interface components; detecting whether flexible shipping is available at the first address; when flexible shipping is available at the first address, presenting one or more second user interface components for specifying a second address, receiving user input specifying the second address, and generating a first shipping label descriptor that identifies both the first address and the second address as respective shipping addresses for a package; when flexible shipping is not available at the first address, generating a second shipping label descriptor that identifies the first address.

20 Claims, 12 Drawing Sheets

(56) References Cited

U.S. PATENT DOCUMENTS

| | | | | |
|---|---|---|---|---|
| 2015/0324733 A1* | 11/2015 | Goodall | ................ | G06Q 10/08 |
| | | | | 705/330 |
| 2015/0324745 A1* | 11/2015 | Goodall | ................ | G06Q 10/08 |
| | | | | 705/337 |
| 2020/0311676 A1* | 10/2020 | Smith, Jr. | ........... | G06F 16/1824 |

OTHER PUBLICATIONS

Suh, S., et al., "Robust Shipping Label Recognition and Validation for Logistics by Using Deep Neural Networks," 2019 IEEE International Conference on Image Processing (ICIP), Proceedings, ISBN 978-1-5386-62496-6, pp. 4509-4513. (Year: 2019).*

* cited by examiner

FIG. 3

FIRST SHIPPING ADDRESS:

FIRST NAME: PRAGYA
LAST NAME: AGARWAL
STREET NAME: BLG 9 PT PARK
PIN CODE: 123456
CITY: BANGALORE
STATE: KARMAKA

AVAILABLE FLEXIBLE SHIPPING

PHONE NUMBER
EMAIL ADDRESS

DELIVERY METHOD
● STANDARD DELIVERY
● EXPECTED DELIVERY

CART — SHIPPING — PAYMENT — VERYFY & SUBMIT — ORDER SUMMARY

SUMMARY (1 ITEM)
$180 TOTAL SAVINGS
SUBTOTAL $229.00
CONTINUE

PAYMENT

CART | SHIPPING | PAYMENT | VERYFY & SUBMIT | ORDER SUMMARY

SELECT METHOD OF PAYMENT

[FINANCING] — 620  [CREDIT/DEBIT CARD] — 620  [GIFT CARD] — 620

APPLY FOR FINANCING

INCREASE YOUR PURCHASING POWER WITH SPECIAL FINANCING OFFERS AND LOW MONTHLY PAYMENTS.

*APPLY AND FINISH CHECKING OUT.*

ALREADY HAVE FINANCING

FINANCE THIS ORDER WITH LOW MONTHLY PAYMENTS.

*CONTINUE AND PAY WITH PREFERRED ACCOUNT.*

SPLIT YOUR PAYMENT

YOU CAN SPLIT YOUR PURCHASE BETWEEN 1-3 FORMS OF PAYMENT

---

SUMMARY (1 ITEM) — 610
$150 TOTAL SAVINGS
SUBTOTAL          $229.00
                  FREE
                  $18.97
                  $247.00

VERIFY & SUBMIT ORDER

CART — SHIPPING — PAYMENT — VERIFY & SUBMIT — ORDER SUMMARY

ORDER INFORMATION

SHIP TO   MXX TXXWXX TXX FXX SXX SXX
BUILDING 9A PRITECH,
PARK, BANGALORE,
560089

MXX TXXWXX TXX FXX SXX
ROYAL ENCLAVE,
MARATHALLI, BANGALORE,
560037

BILL TO   SAME AS SHIPPING

PAYMENT METHOD   CREDIT CARD ENDING IN 1234
EXPIRES 1/1/24

SUMMARY

| ITEM | QUANTITY |
|---|---|
| INSPIRON 11 LAPTOP<br>▶ VIEW FULL SPECS | 1 |

SUMMARY (1 ITEM)
$150 TOTAL SAVINGS

SUBTOTAL   $229.00
SHIPPING   FREE
TAX        $18.97
TOTAL  ⌐712  $247.00

[ SUBMIT ORDER ]

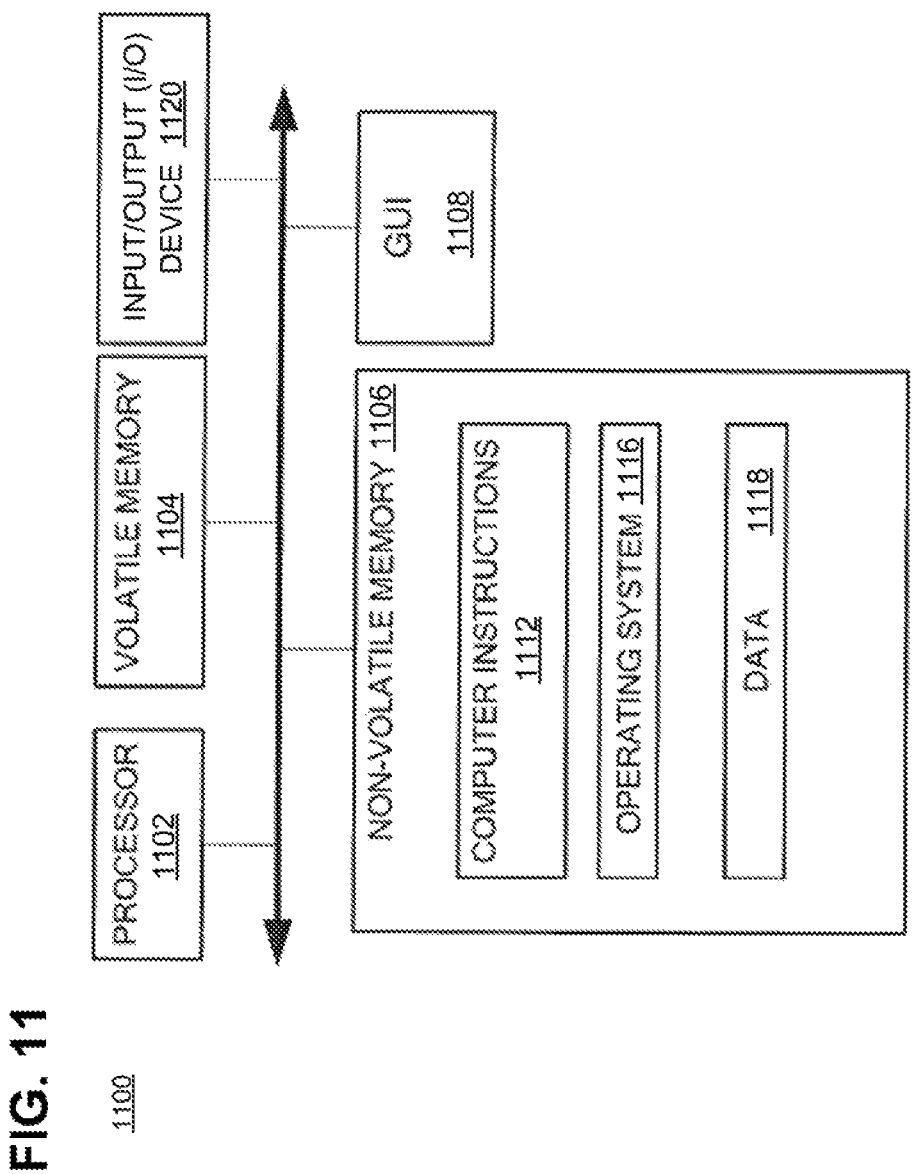

FLEXIBLE PRODUCT DELIVERY MODEL

BACKGROUND

Online shopping is a form of e-commerce that permits users to buy goods and services over the Internet. A typical online shopping website includes a catalog of goods and services that are available for sale and a checkout interface. The catalog may be used to select goods and services for purchase, and the checkout interface for may be used to provide payment information and/or a shipping address for the goods and services. The checkout interface in a website may include a shopping cart and/or any other interface that is used for specifying a shipping address for purchased goods or services.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: presenting one or more first user interface components for specifying a first address; receiving user input specifying at least a portion of the first address, the user input being received by using the one or more first user interface components; detecting whether flexible shipping is available at the first address; when flexible shipping is available at the first address, presenting one or more second user interface components for specifying a second address, receiving user input specifying the second address, and generating a first shipping label descriptor that identifies both the first address and the second address as respective shipping addresses for a package; when flexible shipping is not available at the first address, generating a second shipping label descriptor that identifies the first address.

According to aspects of the disclosure, a system is provided, comprising: a memory; and at least one processor operatively coupled to the memory, the at least one processor being configured to perform the operations of: presenting one or more first user interface components for specifying a first address; receiving user input specifying at least a portion of the first address, the user input being received by using the one or more first user interface components; detecting whether flexible shipping is available at the first address; when flexible shipping is available at the first address, presenting one or more second user interface components for specifying a second address, receiving user input specifying the second address, and generating a first shipping label descriptor that identifies both the first address and the second address as respective shipping addresses for a package; when flexible shipping is not available at the first address, generating a second shipping label descriptor that identifies the first address.

According to aspects of the disclosure, a non-transitory computer-readable medium storing one or more processor-executable instructions, which, when executed by at least one processor, cause the at least one processor to perform the operations of: presenting one or more first user interface components for specifying a first address; receiving user input specifying at least a portion of the first address, the user input being received by using the one or more first user interface components; detecting whether flexible shipping is available at the first address; when flexible shipping is available at the first address, presenting one or more second user interface components for specifying a second address, receiving user input specifying the second address, and generating a first shipping label descriptor that identifies both the first address and the second address as respective shipping addresses for a package; when flexible shipping is not available at the first address, generating a second shipping label descriptor that identifies the first address.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of a user interface screen, according to aspects of the disclosure:

FIG. 4 is a diagram of an example of a user interface screen, according to aspects of the disclosure:

FIG. 5 is a diagram of an example of a user interface screen, according to aspects of the disclosure;

FIG. 6 is a diagram of an example of a user interface screen, according to aspects of the disclosure;

FIG. 7 is a diagram of an example of a user interface screen, according to aspects of the disclosure;

FIG. 11 is a diagram of an example of a computing device, according to aspects of the disclosure.

DETAILED DESCRIPTION

Figures 1A, 1B:
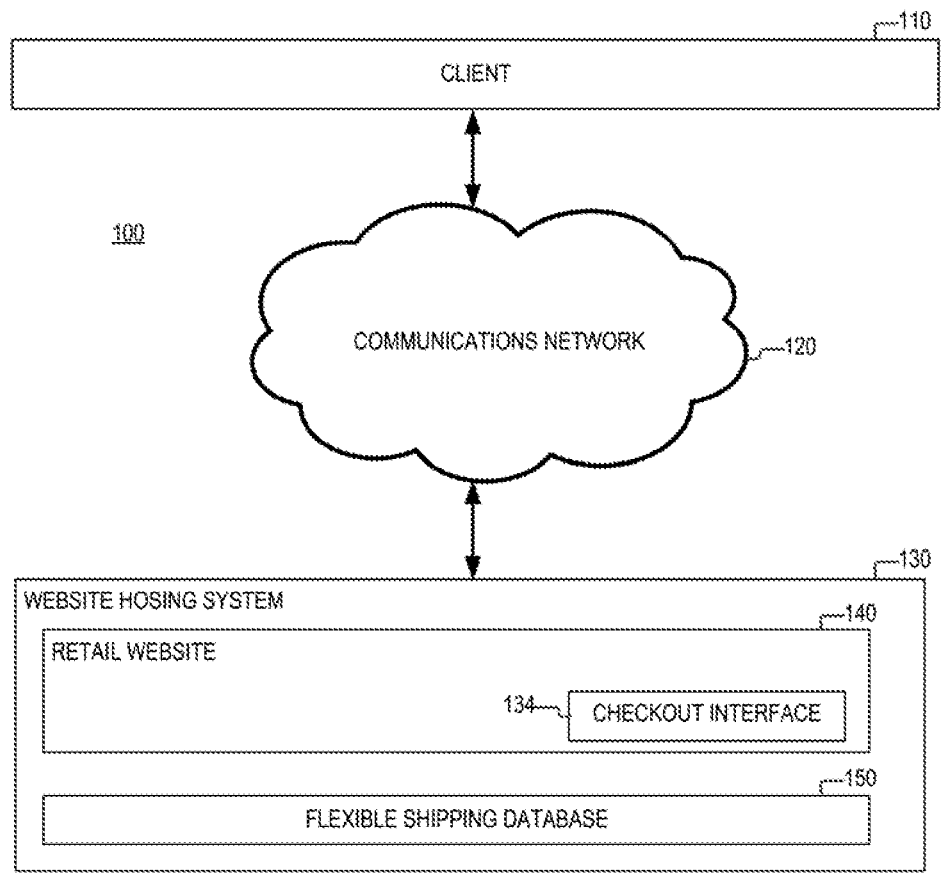
FIG. 1A is a diagram of an example of a system, according to aspects of the disclosure.
FIG. 1B is a diagram of an example of a flexible shipping database, according to aspects of the disclosure.

FIG. 1 is a diagram of an example of a system 100, according to aspects of the disclosure. As illustrated, the system 100 may include a client device 110, a communications network 120, and a website hosting system 130. The client device 110 may include any suitable type of computing device, such as a smartphone, a desktop computer, a laptop, etc. Additionally or alternatively, in some implementations, the client device 110 may include a computing device, such as the computing device 1100, which is discussed further below with respect to FIG. 11. The communications network 120 may include one or more of a local area network (LAN), a wide area network (WAN), the Internet, and/or any other suitable type of communications network. The system 130 may include any suitable type of website hosting system. For example, in some implementations, the system 130 may include one or more servers that are configured to provide website hosting services. Additionally or alternatively, in some implementations, the system 130 may be implemented by using one or more computing devices, such as the computing device 1100, which is discussed further below with respect to FIG. 11.

The system 130 may be configured to host a retail website 140 and a flexible shipping database 150. The retail website 140 may include a checkout interface 134. The checkout interface 134 may include any suitable interface for receiving payment and shipping information for products that are offered for sale on the retail website 140. In some implementations, the checkout interface 134 may include a website shopping cart. Additionally or alternatively, in some implementations, the checkout interface 134 may include software that is arranged to provide a series of user interface screens for entering payment and shipping information. An example of one possible implementation of the checkout interface 134 is discussed further below with respect to FIGS. 2-9.

According to the present disclosure, the checkout interface 134 is configured to support a flexible shipping option. Flexible shipping, as used herein, may refer to a service that allows the user to specify multiple delivery addresses for a package (e.g., when the exact delivery date for the package is uncertain). For example, when flexible shipping is available for the package, the user may specify that the package is to be delivered at either one of a first address and a second address. As another example, when flexible shipping is available for the package the user may specify that: (i) if the delivery date of the package falls on a first date, the package may be delivered at a first address, and (ii) and if the delivery date of the package falls on a second date, the package may be delivered at a second address. For instance, consider an example in which a user is working from home on Mondays and Tuesdays and in his or her office on Wednesdays, and Thursdays, and Fridays. When flexible shipping is available, the user may specify that they would like to have the package delivered at their home address if the delivery date of the package happens to fall on Monday or Tuesday. Similarly, the user may specify that they would like the package delivered at their work address if the delivery date of the package falls on either of Wednesday, Thursday, or Friday. In some respects, flexible shipping is advantageous because it can increase the likelihood of a package being successfully delivered at the first delivery attempt, thereby reducing the overall shipping cost of the package. Furthermore, flexible shipping can increase the speed at which packages are delivered to their recipients, thereby increasing customer satisfaction.

The flexible shipping database 150 may include one or more data structures that identify locations where flexible shipping is available. As illustrated in FIG. 1B, the flexible shipping database may include a plurality of entries 152. Each entry 152 may include a respective location identifier 154 and a respective availability identifier 156. The respective availability identifier 156 in any of the entries 152 may include any number, string or alphanumerical string that indicates whether flexible shipping is available at the location specified by the entry's 152 respective location identifier 154. Although in the example of FIG. 1B, each of the location identifiers 154 includes a city name, alternative implementations are possible, in which another type of location identifier is used, such as a street address or GPS coordinates. Stated succinctly, FIG. 1B is provided as an example only, and the present disclosure is not limited to any specific implementation of the flexible shipping database 150.

Figure 2:
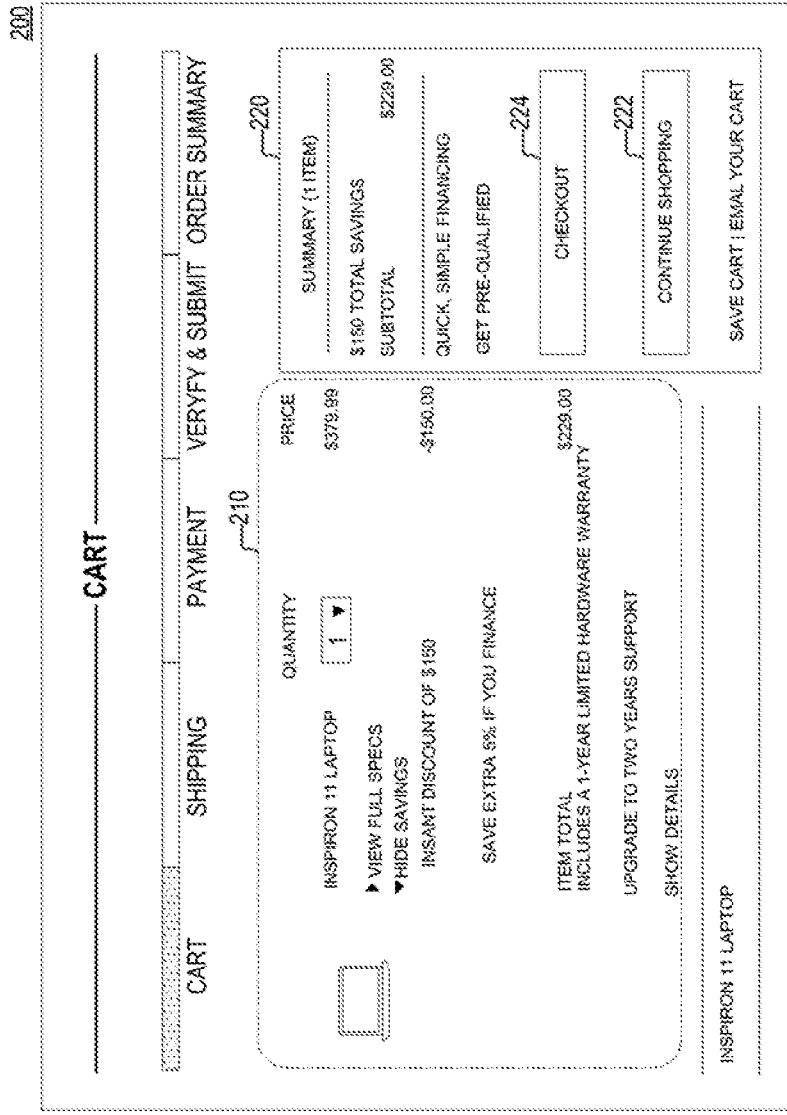
FIG. 2 is a diagram of an example of a user interface screen, according to aspects of the disclosure.

FIG. 2 is a diagram of an example of a screen 200 that is part of the checkout interface 134. The screen 200 may be displayed on a display device (e.g., an LCD screen) that is part of the client device 110. As illustrated, the screen 200 may include a portion 210 that is configured to provide information about a product (e.g., a laptop computer) that has been selected for purchase. The information may include an image of the product, the name of the product, the cost of the product, and an indication of a quantity of the product that is desired to be purchased. Furthermore, the screen 200 may include an order summary menu 220 that identifies the cost of the product and includes a checkout button 224 and a continue-shopping button 222. Pressing the continue-shopping button 222 may cause the client device 110 (and/or the system 130) to display another screen that allows the user to make further purchases. Pressing the checkout button 224 may cause the client device 110 (and/or the system 130) to display a screen 300 (shown in FIG. 3) for entering shipping information for the product.

Figure 3:
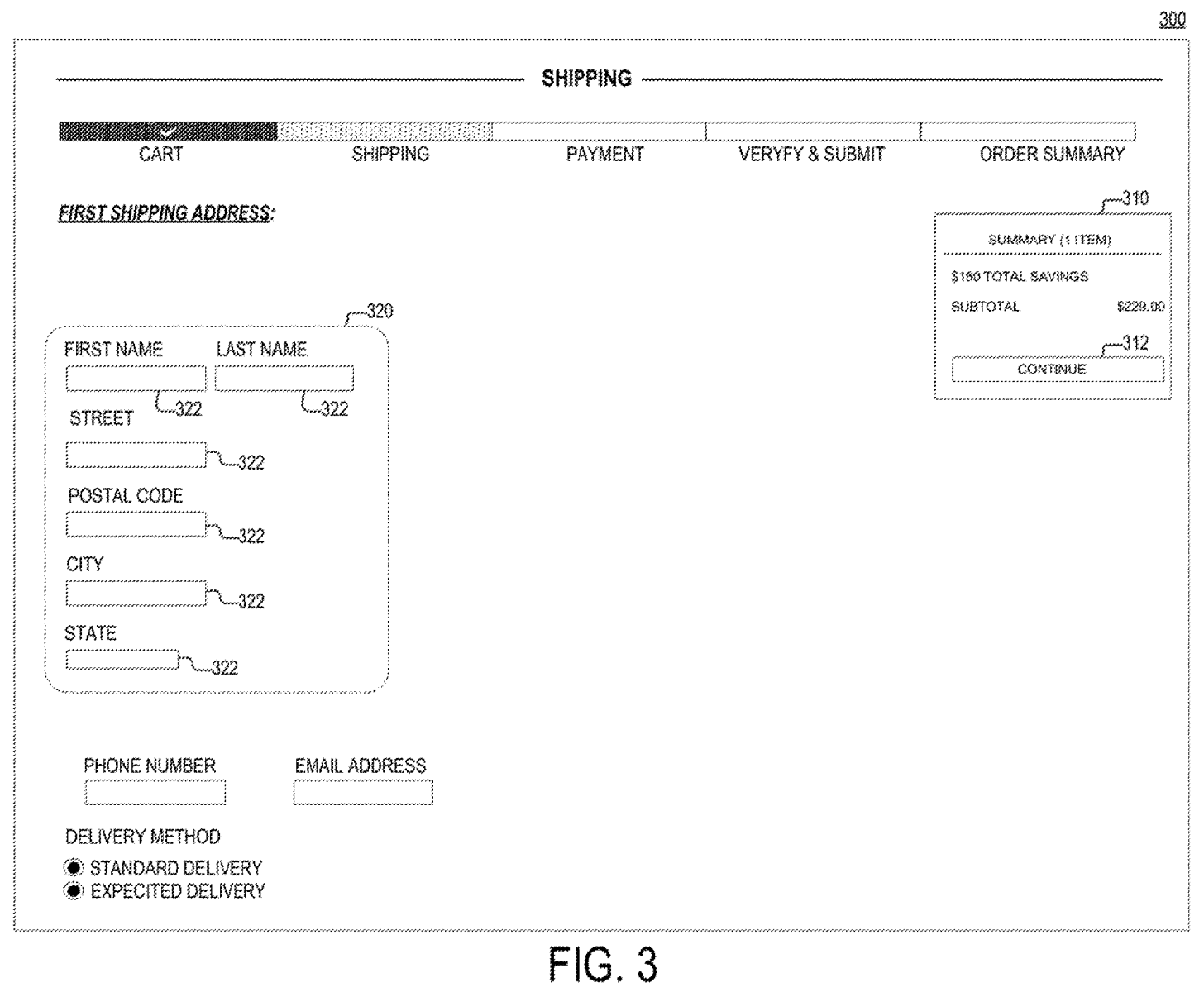

FIG. 3 is a diagram of a screen 300 for entering shipping information. FIG. 3 shows the screen at time=$T_0$ (i.e., immediately after the screen 300 is displayed following the pressing of the checkout button 224). As illustrated, the screen 300 may include an order summary section 310 that includes a continue button 312. Furthermore, the screen 300 may include a section 320 that includes one or more first user interface components 322 for specifying a first address (e.g., a first shipping address). According to the present example, the first user interface components 322 include text input fields for entering the first name of a recipient, the last name of the recipient, a street name, a postal code, a city, and a state. Although in the example of FIG. 3, text input fields are used for receiving the first address, the present disclosure is not limited to using any specific type of input component for entering the first address.

FIG. 4 shows the screen 300 at time=$T_1$ (i.e., after the user has entered the first address by using the first user interface components 322). As illustrated, when the first address is entered, the client device 110 (and/or the system 130) may perform a search of the flexible shipping database 150 to determine whether flexible shipping is available at the first address. If flexible shipping is available, the client device 110 (and/or the system 130) may display a user interface component 330 for specifying whether the user wants to use flexible shipping. In some implementations, the user interface component 330 may be displayed in the screen 300 only when flexible shipping is available, and it may remain hidden when flexible shipping is not available. Although in the example of FIG. 4, the user interface component is a checkbox, the present disclosure is not limited to using any specific user interface component for specifying that flexible shipping is desired to be used. For example, in some implementations, instead of a checkbox, the user interface component 330 may include a slider or a button.

Figure 5:
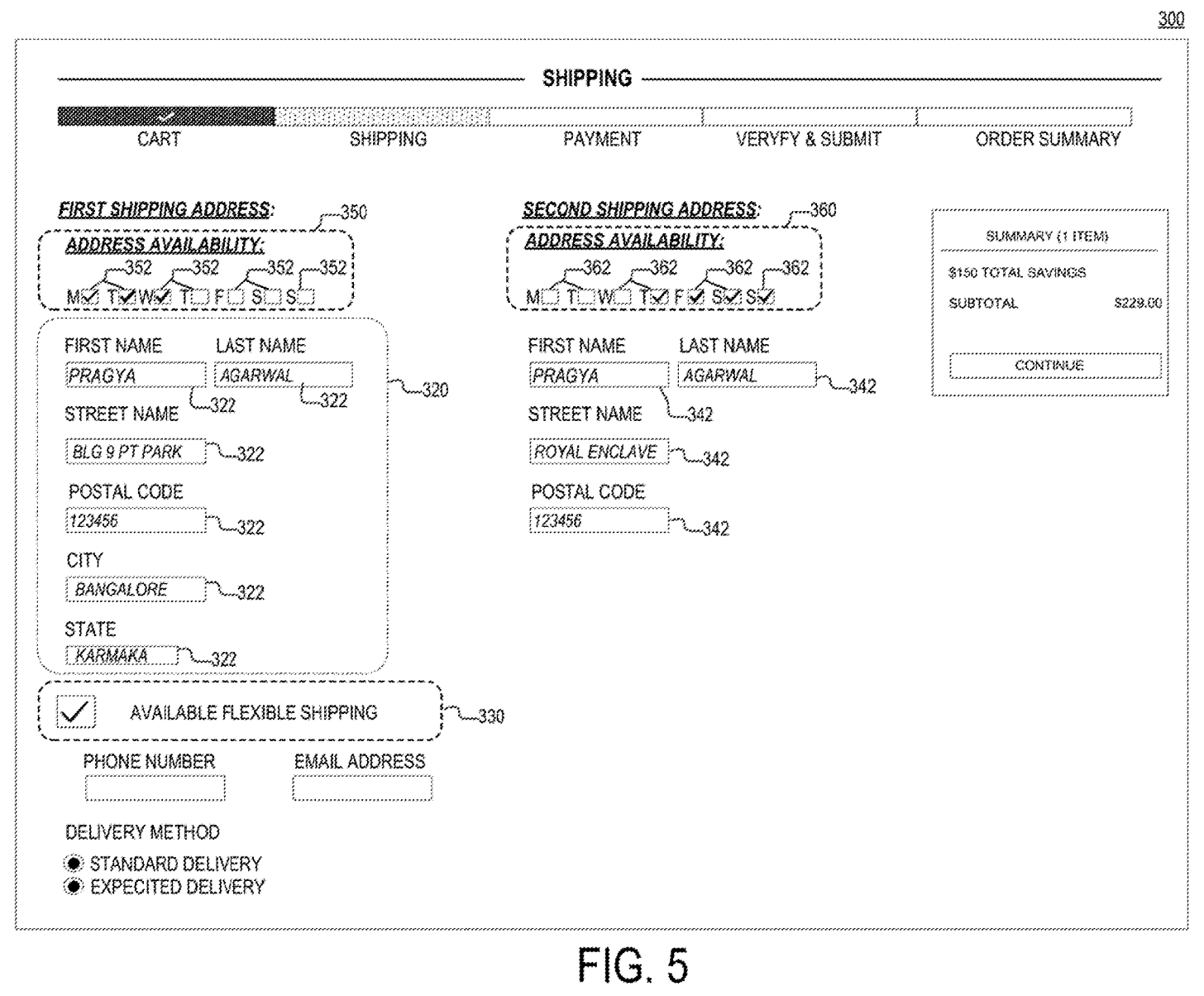

FIG. 5 shows the screen 300 at time=$T_2$ (i.e., after the user has activated the user interface component 330, thus indicating that the user would like to use flexible shipping.) As illustrated, when the user interface component 330 is activated, the client device 110 (and/or the system 130) may display (in the screen 300) one or more second user interface components 342 for specifying a second address. According to the present example, the second user interface components 342 include text input fields for entering the first name of a recipient, the last name of the recipient, a street name, postal code, city, and state. Although in the example of FIG. 5, text input fields are used for receiving the second address, the present disclosure is not limited to using any specific type of input component for entering the address. Although in the present example the first user interface components 322 and the second user interface components 342 are displayed concurrently, alternative implementations are possible, in which the first user interface components 322 and the second user interface components 342 are displayed in different screens. Stated succinctly, the present disclosure is not limited to any specific method for presenting the second user interface components 342.

Furthermore, when the user interface component 330 is activated, the client device 110 (and/or the system 130) may display a menu 350 and a menu 360. The menu 350 may include one or more user interface components for specifying one or more times when the product is desired to be delivered at the first address. The menu 360 may include one or more user interface components for specifying one or more times when the product is desired to be delivered at the second address. In some implementations, the menu 350 and the menu 360 may be displayed only when the user interface component 330 is activated, and they may remain hidden otherwise. Although in the present example both the menus 350 and 360 are displayed, alternative implementations are possible, in which only one of the menus 350 and 360 is displayed. For instance, when only the menu 350 is displayed, the client device 110 (and/or system 130) may determine that the product is desired to be delivered at the first address at the time(s) specified in the menu 350, while at all other times the product is desired to be delivered at the second address. Similarly, when only the menu 360 is displayed, the client device 110 (and/or system 130) may determine that the product is desired to be delivered at the second address at the time(s) specified in the menu 360, while at all other times the product is desired to be delivered at the second address.

According to the present example, the menu 350 includes a plurality of checkboxes 352, wherein each checkbox 352 corresponds to a different day of the week. Selecting any of the checkboxes 352 indicates that the product is desired to be delivered at the first address at the checkbox's respective day of the week. According to the present example, checkboxes 352 are selected, which correspond to Monday. Tuesday, and Wednesday, indicating that the product is desired to be delivered on those days at the first address. Although in the present example the menu 350 allows for the specification of individual days, alternative implementations are possible, in which the menu 350 permits the delivery times to be specified with a higher granularity. For example, in some implementations, the menu 350 may be arranged to receive user input specifying particular time windows during the day when the product is desired to be delivered at the first address. Although in the present example, the menu 350 includes checkboxes, the present disclosure is not limited to using any specific type of input components for specifying the times when the product is desired to be delivered at the first address. For instance, in some implementations, the checkboxes 352 may be replaced with a text input field for specifying times when the product can be delivered at the first address.

According to the present example, the menu 360 includes a plurality of checkboxes 362, wherein each checkbox 362 corresponds to a different day of the week. Selecting any of the checkboxes 362 indicates that the product is desired to be delivered at the second address at the checkbox's respective day of the week. According to the present example, checkboxes 362 are selected, which correspond to Thursday, Friday, Saturday, and Sunday, indicating that the product is desired to be delivered on those days at the second address. Although in the present example the menu 360 allows for the specification of individual days, alternative implementations are possible in which the menu 360 permits the delivery times to be specified with a higher granularity. For example, in some implementations, the menu 360 may be arranged to receive user input specifying particular time windows during the day when the product is desired to be delivered at the second address. Although in the present example, the menu 360 includes checkboxes, the present disclosure is not limited to using any specific type of input components for specifying the times when the product is desired to be delivered at the second address. For instance, in some implementations, the checkboxes 362 may be replaced with a text input field for specifying times when the product can be delivered at the second address.

According to aspects of the disclosure, after the user has entered the second address (by using second user interface components 342) and specified the respective delivery times for the first address and the second address (e.g., by using the menus 350 and 360, respectively), the user may press the continue button 312. In some implementations, pressing the continue button 312 may cause the client device 110 (and/or the system 130) to display a screen 600 for entering payment information. As illustrated in FIG. 6, the screen 600 may include a summary portion 610 that provides information about the product purchase and includes a continue button 612. Furthermore, the screen 600 may include user interface components 620 for providing payment information. After the user has provided payment information, the user may press the continue button 612. In some implementations, pressing the continue button 612 may cause the client device 110 (and/or the system 130) to display an order verification screen 700 (shown in FIG. 7).

As illustrated in FIG. 7, the order verification screen may identify the first address (e.g., the address entered by using the first user interface components 322) and the second address (e.g., the address entered by using the second user interface components 342). Additionally or alternatively, in some implementations, the order verification screen 700 may identify one or more first times for delivering the product to the first address and one or more second times for delivering the product to the second address. Furthermore, the order verification screen may include a description of the product, an identification of the payment account that is going to be used to pay for the product, an indication of the price of the product, and/or any other information concerning the purchase of the product. The order verification screen 700 may give the user the opportunity to confirm that the entered address and payment information is correct. After the user has confirmed that the entered address and payment information is correct, the user can press the submit button 712. In some implementations, pressing the submit button 712 may cause the client device 110 (and/or the system 130) to display an order summary screen 800 (shown in FIG. 8).

Figure 8:
FIG. 8 is a diagram of an example of a user interface screen, according to aspects of the disclosure.

As illustrated in FIG. 8, the order summary screen may include an order number for tracking the order, an indication of first address (i.e., the address specified by using the first user interface components 322), an indication of the second address (e.g., the address specified by using the second user interface components 342). Additionally or alternatively, in some implementations, the order summary screen 800 may identify one or more first times for delivering the product to the first address and one or more second times for delivering the product to the second address. Additionally or alternatively, in some implementations, the order summary screen 800 may include an identification of the product and/or any other suitable information that is associated with the product purchase. According to the example of FIGS. 1-8, the first address and the second address are specified when the order for the product is being initially submitted, prior to any subsequent revision of the order. This is in contrast to systems that permit the specification of a single delivery address and allow for the address to be revised afterwards.

Figure 9:
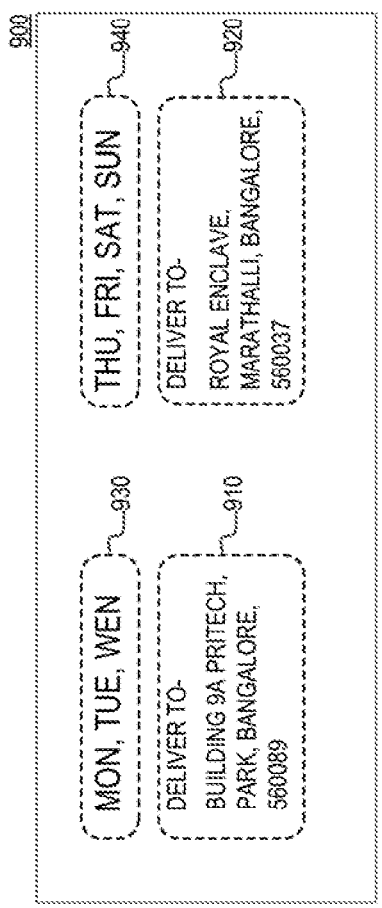
FIG. 9 is a diagram of an example of a shipping label, according to aspects of the disclosure.

Additionally or alternatively, in some implementations, pressing the continue button 712 may further cause the system to generate a shipping label descriptor for the package. In some implementations, the shipping label descriptor may be an electronic representation of a shipping label. Additionally or alternatively, in some implementations, the shipping label descriptor may include the first address, the second address, as well as any other information that is customarily found in shipping labels, such as the sender's address, package weight, shipping rate, etc. FIG. 9 shows an example of a shipping label descriptor 900, according to aspects of the disclosures. As illustrated, the shipping label descriptor 900 may include a field 910 that identifies the first address (e.g., the address entered by using the first user interface components 322) and a field 920 that includes the second address (e.g., the address entered by using the second user interface components 342). Furthermore, according to the example of FIG. 9, the shipping label descriptor may include a field 930 and a field 940. The field 930 may identify one or more days on which the product may be delivered at the first address. And the field 940 may identify one or more days on which the package containing the product may be delivered at the second address.

Figure 10A:
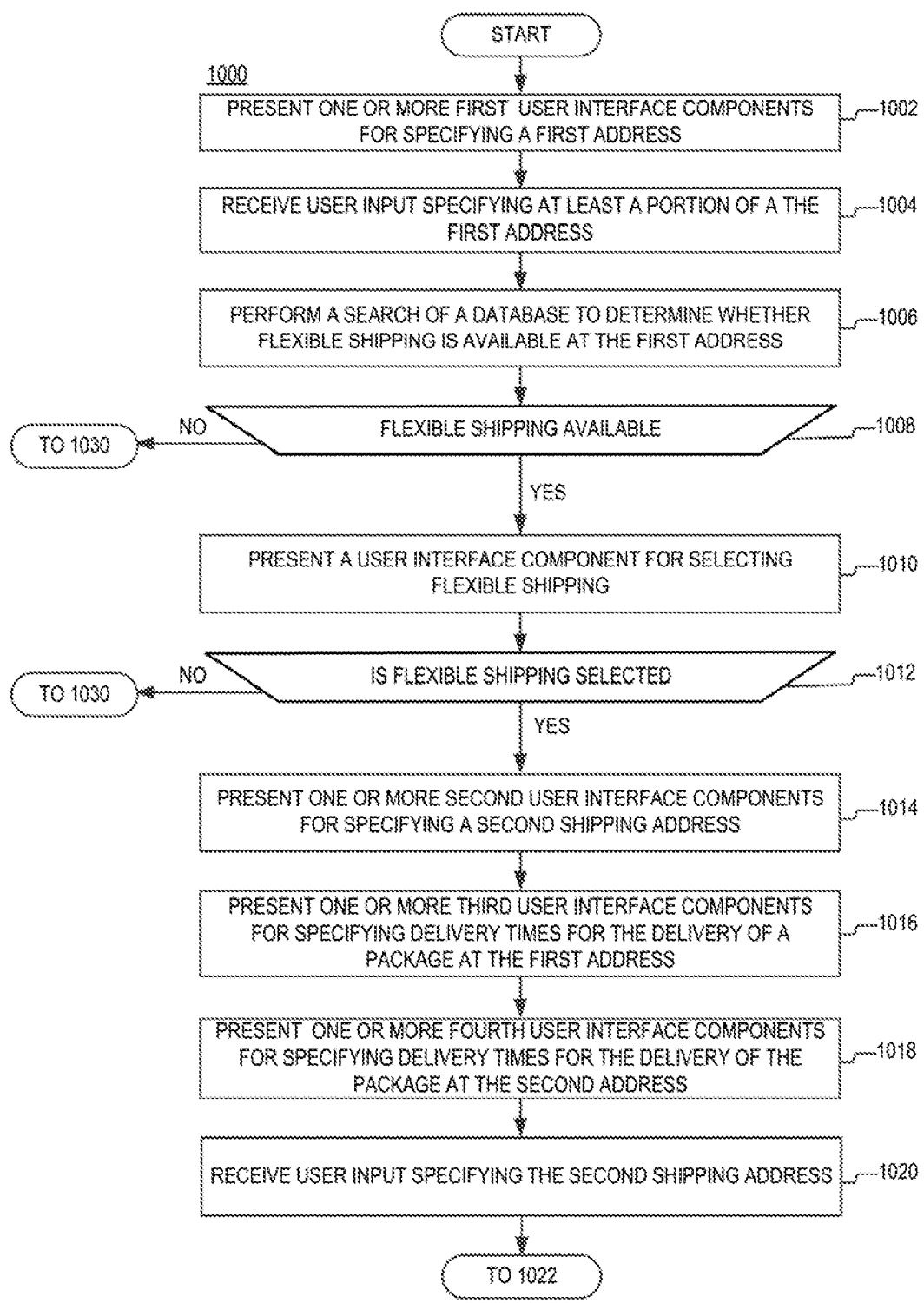
FIG. 10A is a flowchart of an example of a process, according to aspects of the disclosure.
Figure 10B:
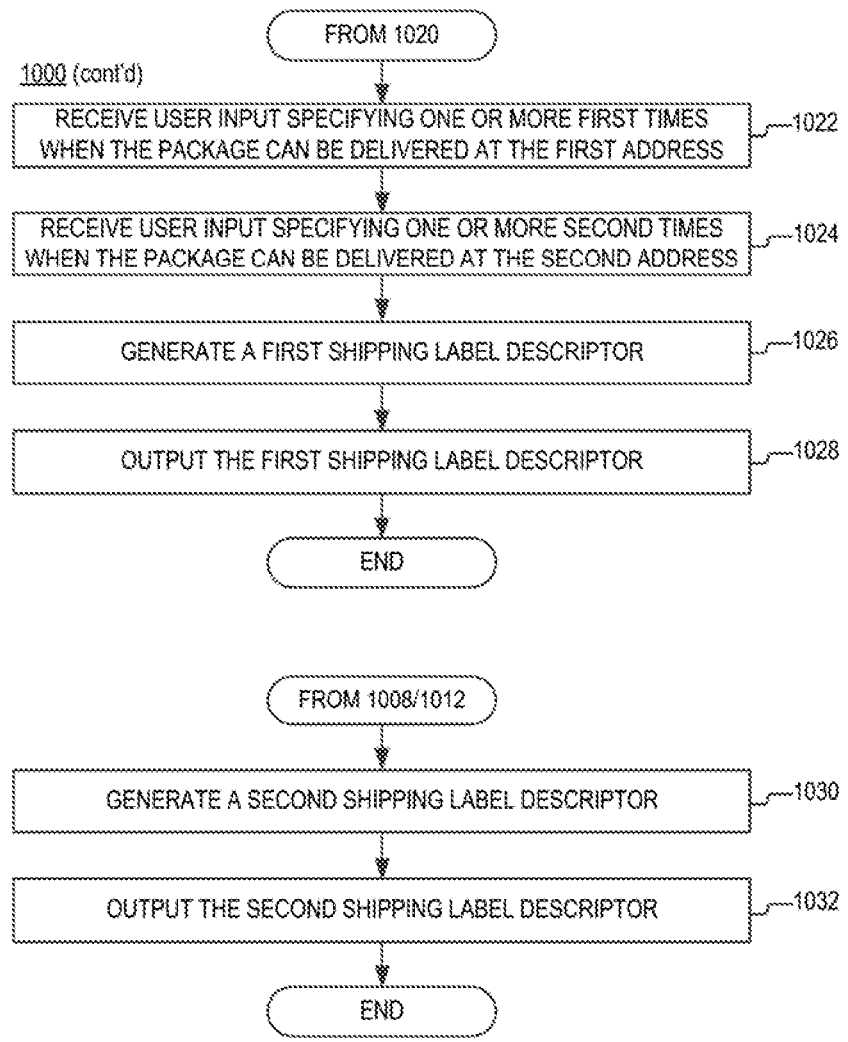
FIG. 10B is a flowchart of an example of a process, according to aspects of the disclosure.

FIGS. 10A-B show a flowchart of an example of a process 1000, according to aspects of the disclosure. At step 1002, one or more user interface components are presented for specifying a first address for delivering a package (or product). In some implementations, the one or more first user interface components may be the same or similar to the first user interface components 322, which are discussed above with respect to FIG. 3. At step 1004, a user input is received that specifies at least a portion of the first address. In some implementations, the user input may be received by using the first user interface components (presented at step 1002). In some implementations, the user input may include text input. At step 1006, a search is performed of the flexible shipping database to determine whether flexible shipping is available at the first address. In some implementations, performing the search may include (i) generating a search key based on the user input (received at step 1004), (ii) performing a search of the database based on the search key, (iii) receiving one or more search results, in response to the search, which indicate whether flexible shipping is available at the first address. At step 1008, a determination is made if the outcome of the search indicates that flexible shipping is available at the location of the first address. If flexible shipping is available, the process 1000 proceeds to step 1010. Otherwise, if flexible shipping is not available, the process 1000 proceeds to step 1030.

At step 1010, a user interface component is presented for selecting whether to use flexible shipping. In some implementations, the user interface component may be the same or similar to the user interface component 330. At step 1012, a determination is made if the user interface component for selecting whether to use flexible shipping has been activated. If the user interface component has been activated, the process 1000 proceeds to step 1014. Otherwise, if the user interface component has not been activated, the process 1000 proceeds to step 1030.

At step 1014, one or more second user interface components are presented for specifying a second address for delivering the package (or product). In some implementations, the one or more second user interface components may be the same or similar to the second user interface components 342, which are discussed above with respect to FIG. 5. At step 1016, on or more third user interface components are presented for specifying when a package is desired to be delivered at the first address. In some implementations, the one or more third user interface components may be the same or similar to the checkboxes 352, which are discussed above with respect to FIG. 5. At step 1018, on or more fourth user interface components are presented for specifying when a package is desired to be delivered at the second address. In some implementations, the one or more fourth user interface components may be the same or similar to the checkboxes 362, which are discussed above with respect to FIG. 5. At step 1020, user input is received specifying the second address. In some implementations, the user input may be received by using the one or more second user interface components (presented at step 1014). At step 1022, user input is received specifying one or more first times when the package can be delivered at the first address. In some implementations, as discussed above with respect to FIG. 5, the user input may identify one or more days when the package can be delivered at the first address. In some implementations, the user input may be received via the third user interface components. At step 1024, user input is received specifying one or more second times when the package can be delivered at the second address. In some implementations, as discussed above with respect to FIG. 5, the user input may identify one or more days when the package can be delivered at the second address. In some implementations, the user input may be received via the fourth user interface components At step 1026, a first shipping label descriptor is generated. The first shipping label descriptor may be the same or similar to the shipping label descriptor 900, which is discussed above with respect to FIG. 9. As discussed above, the first shipping label descriptor may identify both the first address and the second address. Additionally or alternatively, in some implementations, the first shipping label descriptor may identify the one or more first times (specified at step 1022). Additionally or alternatively, in some implementations, the first shipping label descriptor may identify the one or more second times (specified at step 1024). At step 1028, the first shipping label descriptor is output. In some implementations, outputting the shipping label descriptor may include sending the first shipping label descriptor to a printing device and causing the first shipping label to be printed. Additionally or alternatively, in some implementations, outputting the first shipping label descriptor may include transmitting the first shipping label descriptor to a logistics system (e.g., a computing system) that is operated by a logistics provider tasked with delivering the package.

At step 1030, a second shipping label descriptor is generated. The second shipping label descriptor may include the first address (specified at step 1004). The second shipping label descriptor may differ from the first shipping label descriptor in that the second shipping label descriptor identifies only one shipping address for the package, whereas the first shipping label descriptor identifies multiple shipping addresses for the package. Furthermore, the second shipping label descriptor may differ from the first shipping label descriptor in that the first shipping label descriptor may identify times when the package can be delivered at different addresses (e.g., the first and second times specified at steps 1022 and 1024 respectively), whereas the first shipping label descriptor may lack such information. At step 1032, the second shipping label descriptor is output. In some implementations, step 1032 may be performed in the same or similar manner as step 1028.

In some implementations, the process 1000 may be performed by the client device 110. In such implementations, the operation of "presenting a user interface component" may include rendering the user interface component on an output device, such as a display screen or an audio speaker. Furthermore, in such implementations, receiving user input may include receiving keyboard input, receiving mouse input, receiving touchscreen input, and/or receiving voice input, for example. According to the example of FIG. 10, the user interface components, which are presented when the process 1000 is executed, include graphical user interface (GUI) input components. However, alternative implementations are possible in which the user interface components include voice interface components. In such implementations, the presentation of a voice interface component may include outputting a voice prompt inviting the user to speak information (e.g., the first address, the second address, the one or more first dates, the one or more second times, etc.). Furthermore, in such implementations, receiving user input may include executing code that is arranged to receive (from a microphone) voice input that is provided by the user.

Additionally or alternatively, in some implementations, the process 1000 may be performed by the system 130. In such implementations, the operation of "presenting a user interface component" may include transmitting to the client device 110 one or more processor-executable instructions, which, when executed by the client device 110, cause the client device 110 to render the user interface component on an output device. Furthermore, in such implementations, the operation of "receiving user input" may include receiving from the client device 110 data that has been input into the client device via a mouse, keyboard, touchscreen, a microphone, a camera, and/or any other suitable type of I/O device that is part of the client device 110.

Referring to FI. 11, computing device 1100 may include processor 1102, volatile memory 1104 (e.g., RAM), non-volatile memory 1106 (e.g., a hard disk drive, a solid-state drive such as a flash drive, a hybrid magnetic and solid-state drive, etc.), graphical user interface (GUI) 1108 (e.g., a touchscreen, a display, and so forth) and input/output (I/O) device 1120 (e.g., a mouse, a keyboard, etc.). Non-volatile memory 1106 stores computer instructions 1112, an operating system 1116 and data 1118 such that, for example, the computer instructions 1112 are executed by the processor 1102 out of volatile memory 1104. Program code may be applied to data entered using an input device of GUI 1108 or received from I/O device 1120.

Processor 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-11 are provided as an example only. At least some of the steps discussed with respect to FIGS. 1-11 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,". "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods.

Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling." "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   presenting one or more first user interface components for specifying a first address;
   receiving user input specifying at least a portion of the first address, the user input being received by using the one or more first user interface components;
   detecting whether flexible shipping is available at the first address;
   when flexible shipping is available at the first address, presenting one or more second user interface components for specifying a second address, receiving user input specifying the second address, and generating a first shipping label descriptor that identifies both the first address and the second address as respective shipping addresses for a package; and
   when flexible shipping is not available at the first address, generating a second shipping label descriptor that identifies the first address.

2. The method of claim 1, wherein the first shipping label descriptor is generated by a checkout interface of a retail website, the method further comprising transmitting the first shipping label descriptor to a logistics system that is arranged to receive a shipping request for the package.

3. The method of claim 1, wherein the first shipping label descriptor is generated by a checkout interface of a retail website, the method further comprising transmitting the first shipping label descriptor to a printer.

4. The method of claim 1, further comprising:
   when flexible shipping is available at the first address, presenting: (i) one or more third user interface components for specifying at least one first time for delivering the package at the first address, and (ii) one or more fourth user interface components for specifying at least one second time for delivering the package at the second address,
   receiving user input specifying the first time for delivering the package at the first address, the user input being received by using the one or more third user interface components; and
   receiving user input specifying the second time for delivering the package at the second address, the user input being received by using the one or more fourth user interface components,
   wherein the first shipping label descriptor identifies the first time for delivering the package at the first address and the second time for delivering the package at the second address.

5. The method of claim 1, wherein the first shipping label descriptor is generated by a checkout interface of a retail website, and the one or more second user interface components are displayed prior to a completion and any subsequent revisions of a purchase order that is associated with the package.

6. The method of claim 1, further comprising, when flexible shipping is available at the first address, presenting a third user interface component for selecting a flexible shipping option, wherein the one or more second user interface components are presented only when the flexible shipping option has been selected by using the third user interface component.

7. The method of claim 1, wherein:
   presenting the one or more first user interface components includes displaying the one or more first user interface components on a display device,
   presenting the one or more second user interface components includes displaying the one or more user second interface components on the display device.

8. The method of claim 1, wherein the first shipping label descriptor is generated by a checkout interface of a retail website, the method further comprising displaying an order summary screen that is associated with the package, the order summary screen identifying the first address, the second address, a first time for delivering the package to the first address, and a second time for delivering the package to the second address.

9. A system, comprising:
   a memory; and at least one processor operatively coupled to the memory, the at least one processor being configured to perform the operations of:

presenting one or more first user interface components for specifying a first address;

receiving user input specifying at least a portion of the first address, the user input being received by using the one or more first user interface components;

detecting whether flexible shipping is available at the first address;

when flexible shipping is available at the first address, presenting one or more second user interface components for specifying a second address, receiving user input specifying the second address, and generating a first shipping label descriptor that identifies both the first address and the second address as respective shipping addresses for a package; and when flexible shipping is not available at the first address, generating a second shipping label descriptor that identifies the first address.

10. The system of claim 9, wherein the first shipping label descriptor is generated by a checkout interface of a retail website, and the at least one processor is further configured to perform the operation of transmitting the first shipping label descriptor to a logistics system that is arranged to receive a shipping request for the package.

11. The system of claim 9, wherein the first shipping label descriptor is generated by a checkout interface of a retail website, the at least one processor is further configured to perform the operation of transmitting the first shipping label descriptor to a printer.

12. The system of claim 9, wherein the at least one processor is further configured to perform the operations of:

when flexible shipping is available at the first address, presenting: (i) one or more third user interface components for specifying at least one first time for delivering the package at the first address, and (ii) one or more fourth user interface components for specifying at least one second time for delivering the package at the second address, receiving user input specifying the first time for delivering the package at the first address, the user input being received by using the one or more third user interface components; and receiving user input specifying the second time for delivering the package at the second address, the user input being received by using the one or more fourth user interface components, wherein the first shipping label descriptor identifies the first time for delivering the package at the first address and the second time for delivering the package at the second address.

13. The system of claim 9, wherein the first shipping label descriptor is generated by a checkout interface of a retail website, and the one or more second user interface components are displayed prior to a completion and any subsequent revisions of a purchase order that is associated with the package.

14. The system of claim 9, wherein the at least one processor is further configured to perform the operation of, when flexible shipping is available at the first address, presenting a third user interface component for selecting a flexible shipping option, and the one or more second user interface components are presented only when the flexible shipping option has been selected by using the third user interface component.

15. The system of claim 9, wherein:

presenting the one or more first user interface components includes displaying the one or more first user interface components on a display device, presenting the one or more second user interface components includes displaying the one or more user second interface components on the display device.

16. The system of claim 9, wherein the first shipping label descriptor is generated by a checkout interface of a retail website, and the at least one processor is further configured to perform the operation of an order summary screen that is associated with the package, the order summary screen identifying the first address, the second address, a first time for delivering the package to the first address, and a second time for delivering the package to the second address.

17. A non-transitory computer-readable medium storing one or more processor-executable instructions, which, when executed by at least one processor, cause the at least one processor to perform the operations of:

presenting one or more first user interface components for specifying a first address;

receiving user input specifying at least a portion of the first address, the user input being received by using the one or more first user interface components;

detecting whether flexible shipping is available at the first address;

when flexible shipping is available at the first address, presenting one or more second user interface components for specifying a second address, receiving user input specifying the second address, and generating a first shipping label descriptor that identifies both the first address and the second address as respective shipping addresses for a package; and when flexible shipping is not available at the first address, generating a second shipping label descriptor that identifies the first address.

18. The non-transitory computer-readable medium of claim 17, wherein the first shipping label descriptor is generated by a checkout interface of a retail website, and the one or more processor-executable instructions, when executed by the at least one processor, further cause the at least one processor to perform the operation of transmitting the first shipping label descriptor to a logistics system that is arranged to receive a shipping request for the package.

19. The non-transitory computer-readable medium of claim 17, wherein the first shipping label descriptor is generated by a checkout interface of a retail website, and the one or more processor-executable instructions, when executed by the at least one processor, further cause the at least one processor to perform the operation of transmitting the first shipping label descriptor to a printer.

20. The non-transitory computer-readable medium of claim 17, wherein the first shipping label descriptor is generated by a checkout interface of a retail website, and the one or more second user interface components are displayed prior to a completion and any subsequent revisions of a purchase order that is associated with the package.

* * * * *